(12) United States Patent
Ohtsu et al.

(10) Patent No.: US 7,542,647 B2
(45) Date of Patent: Jun. 2, 2009

(54) OPTICAL RECEPTION AND TRANSMISSION MODULE

(75) Inventors: Shigemi Ohtsu, Kanagawa (JP);
Toshihiko Suzuki, Kanagawa (JP);
Keishi Shimizu, Kanagawa (JP);
Kazutoshi Yatsuda, Kanagawa (JP);
Masahiro Igusa, Kanagawa (JP); Akira Fujii, Kanagawa (JP); Eiichi Akutsu, Kanagawa (JP)

(73) Assignee: Fuji Xerox Co, Ltd., Tokyo (JP)

( * ) Notice: Subject to any disclaimer, the term of this patent is extended or adjusted under 35 U.S.C. 154(b) by 0 days.

(21) Appl. No.: 12/178,708

(22) Filed: Jul. 24, 2008

(65) Prior Publication Data

US 2009/0103857 A1 Apr. 23, 2009

(30) Foreign Application Priority Data

Oct. 23, 2007 (JP) ............................. 2007-274928

(51) Int. Cl.
*G02B 6/10* (2006.01)
(52) U.S. Cl. ..................... 385/130; 385/129; 385/131; 385/88; 385/89
(58) Field of Classification Search ......... 385/129–131, 385/88, 89, 14
See application file for complete search history.

(56) References Cited

U.S. PATENT DOCUMENTS 7,184,617 B2 * 2/2007 Korenaga et al. ............. 385/14

2002/0122641 A1   9/2002  Nakaya
2006/0198589 A1   9/2006  Sako et al.
2007/0063342 A1 * 3/2007  Chen et al. ................... 257/728
2008/0193094 A1 * 8/2008  Enami et al. ................. 385/130

FOREIGN PATENT DOCUMENTS

| EP | 1862825 A1 | 12/2007 |
| JP | 2002-250851 A | 9/2002 |
| JP | 2003-149807 A | 5/2003 |
| JP | 2006-267584 A | 10/2006 |
| JP | 2006-276819 A | 10/2006 |

* cited by examiner

*Primary Examiner*—Frank G Font
*Assistant Examiner*—Guy G Anderson
(74) *Attorney, Agent, or Firm*—Sughrue Mion, PLLC

(57) ABSTRACT

An optical transmission unit of an optical reception and transmission module holds a first end portion of the optical waveguide film on the first holding member so that light emitted from the light emitting device is coupled to an incident end surface of the optical waveguide. An optical reception unit holds a second end portion of the optical waveguide film on the second holding member so that light emitted from an emitting end surface of the optical waveguide is received by the light receiving device. At least the optical waveguide film is covered with flame-retardant resin having flame retardancy of HB or higher according to a UL-94 test and a minimum bending radius of the optical waveguide film covered with the flame-retardant resin and having a flame-retardant resin layer formed on its surface is from 1 mm to 3 mm.

20 Claims, 5 Drawing Sheets

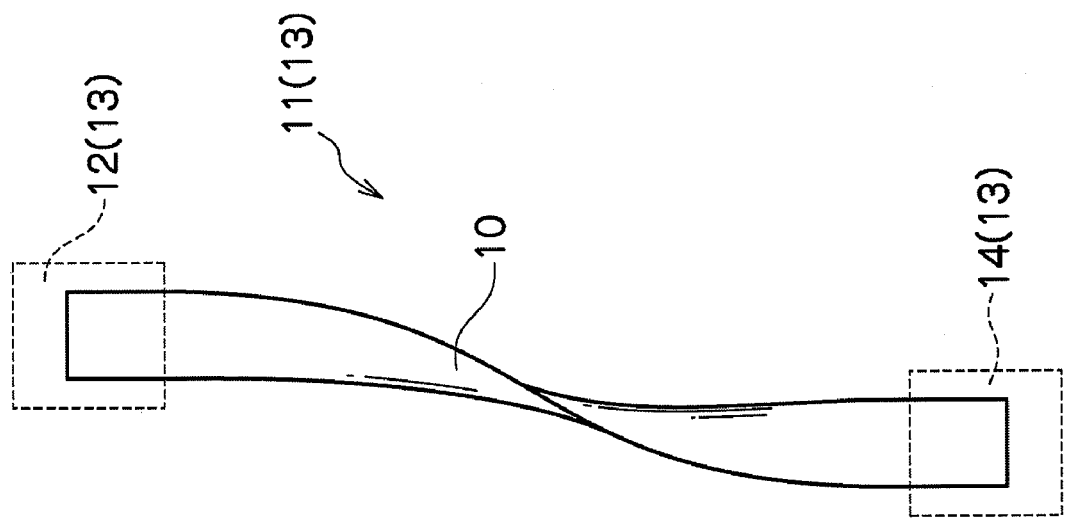
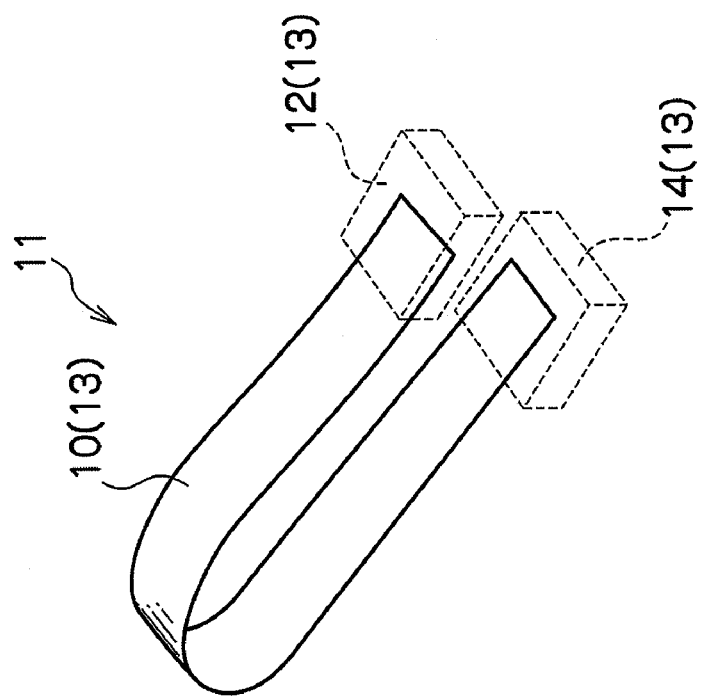

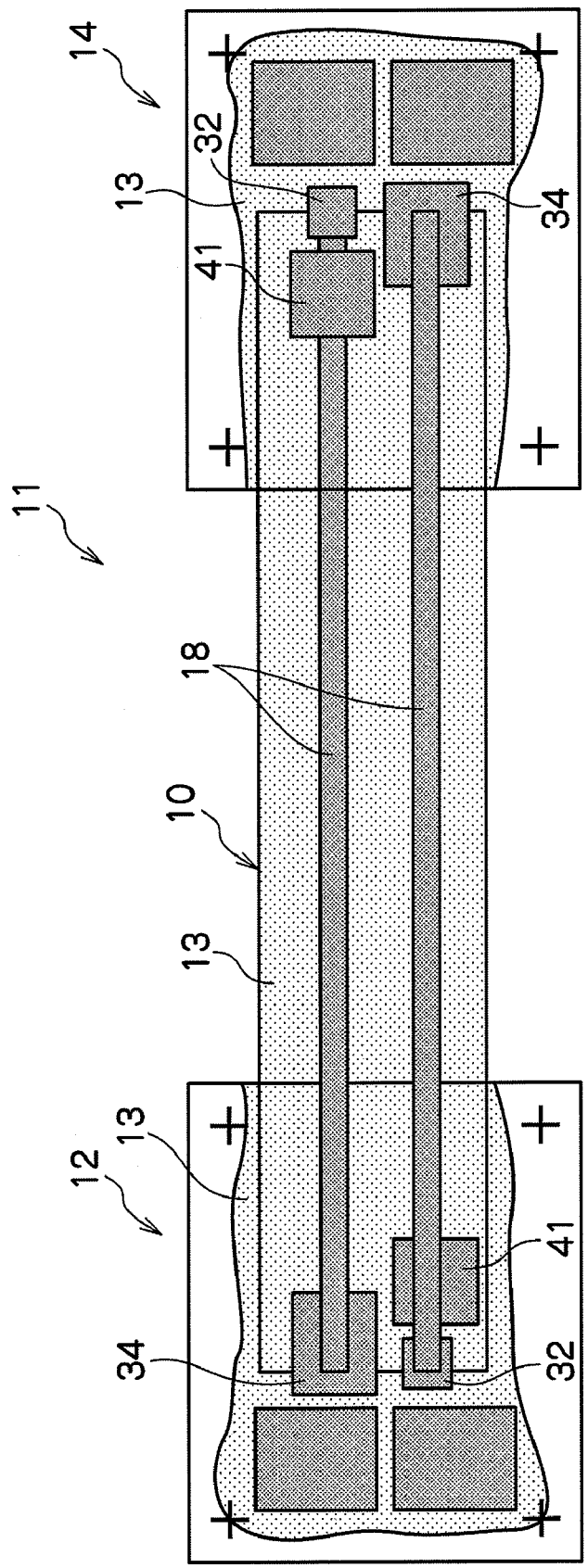

United States Patent US 7,542,647 B2

OPTICAL RECEPTION AND TRANSMISSION MODULE

CROSS-REFERENCE TO RELATED APPLICATION

This application is based on and claims priority under 35 USC 119 from Japanese Patent Application No. 2007-274928 filed Oct. 23, 2007.

BACKGROUND

1. Technical Field

The present invention relates to an optical reception and transmission module utilized for a mobile device.

2. Related Art

In IC technology and LSI technology, it has been noticed that in order to improve operating speed and integration level, optical wiring is mounted between devices, between boards in devices, and between chips in devices instead of mounting high-density electric wiring. In some cases, an optical reception and transmission module with an optical waveguide film is used to realize this optical wiring.

When the optical reception and transmission module is mounted in a small device such as a mobile device, high flexibility is required. Because the module is often disposed near various circuits, flame retardancy of the optical waveguide film is required in some cases.

SUMMARY

According to an aspect of the invention, there is provided an optical reception and transmission module including an optical waveguide film formed with an optical waveguide; an optical transmission unit having a light emitting device and a first holding member for holding the light emitting device, and which holds a first end portion of the optical waveguide film on the first holding member so that light emitted from the light emitting device is coupled to an incident end surface of the optical waveguide; and an optical reception unit comprising a light receiving device and a second holding member for holding the light receiving device, and which holds a second end portion of the optical waveguide film on the second holding member so that light emitted from an emitting end surface of the optical waveguide is received by the light receiving device, wherein at least the optical waveguide film is covered with flame-retardant resin having flame retardancy of HB or higher according to a UL-94 test and a minimum bending radius of the optical waveguide film covered with the flame-retardant resin and having a flame-retardant resin layer formed on a surface thereof is from 1 mm to 3 mm.

BRIEF DESCRIPTION OF THE DRAWINGS

An exemplary embodiments of the present invention will be described in detail based on the following figures, wherein:

FIGS. 2A and 2B are figures showing a following property to deformation of the optical reception and transmission module according to the exemplary embodiment.

FIG. 5 is a plan view of optical transmission and reception units of the optical reception and transmission module according to the exemplary embodiment.

DETAILED DESCRIPTION

An example of the exemplary embodiment of the present invention will be described below in detail with reference to the figures.

Optical Reception and Transmission Module

Figure 1:
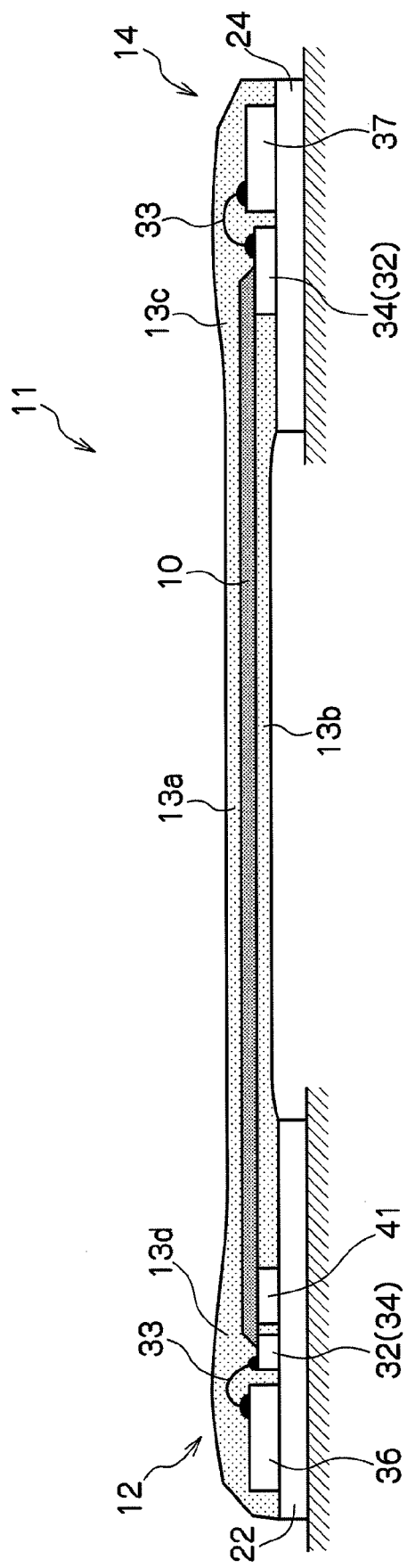
FIG. 1 is a schematic constitutional diagram of an optical reception and transmission module according to the exemplary embodiment.

FIG. 1 is a schematic constitutional diagram of an optical reception and transmission module according to the exemplary embodiment. As shown in FIG. 1, the optical reception and transmission module 11 is made up of a belt-shaped optical waveguide film 10 and an optical reception and transmission unit 12 and an optical reception and transmission unit 14 for transmitting and receiving optical signals through optical waveguides formed in the optical waveguide film 10. The optical reception and transmission unit 12 includes a holding member 22 and a first end portion of the optical waveguide film 10 is held on the holding member 22. The optical reception and transmission unit 14 includes a holding member 24 and a second end portion of the optical waveguide film 10 is held on the holding member 24.

Each of the respective holding member 22 and holding member 24 is provided with a light receiving device 34, a light emitting device 32, a driving circuit 36 for driving the light emitting device 32, and an amplifying circuit 37 for amplifying a signal obtained from the light receiving device 34.

The optical waveguide film 10 provided to the optical reception and transmission module 11, the light receiving devices 34, the light emitting devices 32, the driving circuits 36, and the amplifying circuits 37 provided to the respective holding member 22 and holding member 24 are covered with flame-retardant resin and a flame-retardant resin layer 13 is formed on surfaces of these members. In the exemplary embodiment, "being covered with the flame-retardant resin" refers to forming the flame-retardant resin layer 13 made of the flame-retardant resin on the members to be covered and ensuring that covered members are not in contact with ambient air.

In the case described in the exemplary embodiment, all of the optical waveguide film 10 and the light receiving devices 34, the light emitting devices 32, the driving circuits 36, and the amplifying circuits 37 provided to the respective holding member 22 and holding member 24 are covered with the flame-retardant resin. It is the best preferable that all of the optical waveguide film 10 and the light receiving devices 34, the light emitting devices 32, the driving circuits 36, and the amplifying circuits 37 provided to the respective holding member 22 and holding member 24 are covered in a viewpoint of improvement of flame retardancy of the optical reception and transmission module 11. However, it is essential only that at least the optical waveguide film 10 is covered with the flame-retardant resin. It is preferable that the optical waveguide film 10 and at least one of the light receiving devices 34, the light emitting devices 32, the driving circuits 36, or the amplifying circuits 37 provided to the respective holding member 22 and holding member 24 are covered with the flame-retardant resin.

The flame-retardant resin used in the embodiment is resin having flame retardancy of HB or higher in the UL94 test. When the flame-retardant resin covers the optical waveguide film 10 to form the flame-retardant resin layer 13 on the surface of the optical waveguide film 10, a minimum bending radius of the optical waveguide film 10 is from 1 mm to 3 mm.

UL94 test of the flame-retardant resin is a publicly known burning test that is conducted using a strip specimen having a width of 13.0 mm, a length of 125 mm, and a thickness of 100 µm, which is an actually minimum value, and examines an extent of burning of the specimen by applying a flame of a gas burner in a vertical burning test or a horizontal burning test. As classes of flame retardancy of general materials based on this UL94, there are 5VA, 5VB, V-0, V-1, V-2 and HB in order from high flame retardancy. The flame-retardant resin of the exemplary embodiment has flame retardancy of HB or more according to this UL 94 test, preferably V-2 or more, more preferably V-0 or more, when it is formed as the flame-retardant resin layer.

As the flame-retardant resin having the above characteristic, resin composed mostly of dimethyl polysiloxane (HO—[Si(CH$_3$)$_2$O]N—H) of polymerization degree of 200 to 1000 is used in the exemplary embodiment. The flame-retardant resin composed mostly of dimethyl polysiloxane includes 30 wt. % or more dimethyl polysiloxane.

It is known that a small amount of cyclic dimethyl polysiloxane exists in dimethyl polysiloxane obtained by a normal manufacturing process. Because the cyclic dimethyl polysiloxane lacks reactivity and is volatile, it may cause electric contact fault in some cases. Therefore, in the exemplary embodiment, there is used a flame-retardant resin in which a content of low-molecular siloxane having a cyclic dimethyl type (D form) bond content of D3 (trimer) to D20 (20-mer) is 500 ppm or less, preferably 300 ppm or less.

The flame-retardant resin preferably includes filler having flame retardancy (flame-retardant filler). As the flame-retardant filler, there are titanium oxide, silicon oxide, aluminum oxide, and the like.

In the case where the flame-retardant resin contains the flame-retardant filler, a compounding amount of the flame-retardant filler based on 100 parts by weight of dimethylpolysiloxane is preferably in a range of 1 to 70 parts by weight.

This flame-retardant resin is applied to the members to be covered, and then, is cured by being left at a room temperature, being heated or the like, and thereby it is provided on the surfaces of the members as the flame-retardant resin layer 13. For the application of this flame-retardant resin, a dispenser or the like is used. Therefore, a viscosity of the flame-retardant resin during application needs to be sufficiently low. More specifically, it is from 1 Pa·s to 30 Pa·s, preferably from 2 Pa·s to 20 Pa·s. A solvent may be added for adjusting the viscosity to such an extent as not to exert an adverse effect of the solvent.

A thickness of the flame-retardant resin layer 13 formed by applying the flame-retardant resin to the various members and then, curing the same is from 20 µm to 100 µm, preferably from 30 µm to 80 µm in a linear portion requiring bending performance. In the first holding member 22 and the second holding member 24 not requiring bending performance, since wires of wiring electrodes and the like need to be all covered, the thickness is determined in each case.

The tensile strength of the flame-retardant resin layer 13 (a flame-retardant resin layer 13*a*, a flame-retardant resin layer 13*b*, a flame-retardant resin layer 13*c*, and a flame-retardant resin layer 13*d* in FIG. 1 (collectively referred to as the flame-retardant resin layer 13)) is from 0.5 MPa to 5 MPa, preferably form 1.0 MPa to 4.0 MPa. The tensile strength and the viscosity are measured in conformity with JIS-K6249.

The optical waveguide film 10 on the surface of which the flame-retardant resin layer 13 is formed by covering the film with the flame-retardant resin is formed of a transparent resin film having flexibility and has a following property to deformation such as "bending" and "twisting" as shown in FIGS. 2A and 2B. Therefore, even in a deformed state of the film, the optical signal transmitted from the optical reception and transmission unit 12 is guided through the optical waveguide formed in the optical waveguide film 10 and received by the optical reception and transmission unit 14. The optical waveguide film 10 preferably has flexibility of a minimum bending radius of 3 mm or smaller. The minimum bending radius is a value indicating a minimum radius of a circle if a small part of a curve formed inside the optical waveguide film 10 when the optical waveguide film 10 is bent approximates the circle and its permissible value is measured according to ASTM D-2176. Though details of the resin material used for the optical waveguide film 10 will be described later, at least the portion of the optical waveguide film 10 in contact with the flame-retardant resin layer 13, i.e., the portion to be covered with the flame-retardant resin is preferably made of an acrylic-based resin or an epoxy-based resin.

After the flame-retardant resin layer 13 is provided onto the surface of the optical waveguide film 10, the total thickness of the flame-retardant resin layer 13 provided onto the surface and the optical waveguide film 10 (the sum of the thicknesses of the flame-retardant resin layer 13*a* and the flame-retardant resin layer 13*b* and the thickness of the optical waveguide film 10) is preferably from 50 µm to 500 µm in order to improve the following property to deformation, more preferably from 100 µm to 300 µm. For the same reason, the total width of the flame-retardant resin layer 13 provided onto the surface and the optical waveguide film 10 (the sum of the thickness of the flame-retardant resin layer 13 and the thickness of the optical waveguide film 10 in a width direction of the optical waveguide film 10) is preferably from 0.25 mm to 10 mm, more preferably from 0.3 mm to 2 mm.

The thickness of the optical waveguide film 10 itself before the flame-retardant resin layer 13 is provided is preferably from 50 µm to 300 µm, more preferably from 100 µm to 200 µm. For the same reason, the width is preferably from 0.25 mm to 10 mm, more preferably from 0.25 mm to 5 mm.

The minimum bending radius of the optical waveguide film 10 on the surface of which the flame-retardant resin layer 13 is formed by covering the film 10 with the flame-retardant resin is from 1 mm to 3 mm.

In the optical waveguide film 10, a plurality of cores 18 are embedded in a clad 20 (a lower clad 20*a*, an upper clad 20*b*, embedded clads 20*c*) as shown in FIGS. 3A to 3C and FIGS. 4A to 4C so as to be parallel to one another in the same plane parallel to a principal plane of the optical waveguide film 10. Here, the principal surfaces refer to the surfaces of the optical waveguide film 10 perpendicular to a laminated direction (a thickness direction of the optical waveguide film 10) of the cores 18 and the lower clad 20*a* and the upper clad 20*b* laminated to sandwich the cores 18. To put it concretely, the surface where the embedded clads 20*c* appear alternately in stripes and the opposite surface where only the lower clad 20*a* appears are principal surfaces.

Materials for the cores 18 and the clad 20 of the optical waveguide film 10 according to the exemplary embodiment are not especially limited, as long as they are transparent with respect to a wavelength used in the optical waveguide film 10, and allow a desired refractive index difference between the core 18 and the clad 20 to be set. For example, alicyclic olefin resin, acrylic resin, epoxy resin, polyimide resin, or the like is used. Acrylic resin or epoxy resin is preferably used at least in portion in contact with the flame-retardant resin layer 13 so as to obtain satisfactory adhesiveness to the flame-retardant resin layer 13 made of the flame-retardant resin covering the surface.

However, each clad 20 (the lower clad 20a, the upper clad 20b, the embedded clads 20c) need be made of material having a lower refractive index than the cores 18 so as to exert an optical characteristic as the optical waveguide. Especially for ensuring the refractive index difference from the cores 18, relative refractive index difference is 0.5% or greater, preferably 1% or greater. Differences in refractive index between the respective clads 20 are preferably small. The differences are 0.05 or smaller, preferably 0.001 or smaller, and best preferably zero in a viewpoint of optical confinement.

Figure 4A:
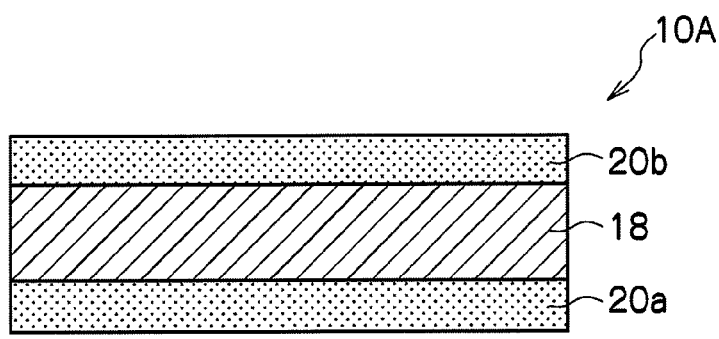
FIGS. 4A to 4C are schematic diagrams showing an example of a manufacturing process of a waveguide core of the optical waveguide film of the optical reception and transmission module according to the embodiment.

A method of manufacturing the optical waveguide film 10 according to the exemplary embodiment is not especially limited. For example, the film 10 is manufactured easily and with high precision by a manufacturing process shown in FIGS. 4A to 4C. First, as shown in FIG. 4A, a laminated body 10A including the cores 18 and the lower clad 20a and the upper clad 20b laminated to sandwich the cores 18 is prepared. For example, on a flat substrate (not shown) made of glass, silicon, or the like, the lower clad 20a, the cores 18, and the upper clad 20b are laminated in order. A method of laminating the respective layers is not especially limited, as long as they are layered integrally so as not to cause peeling between the respective layers. For example, a publicly known method such as a lamination process and spin coating is employed.

A material making the lower clad 20a is not particularly limited, as long as it allows the predetermined refractive index difference from the core 18 to be set, and according to its application, a selection of the material is made in view of a refractive index, optical properties such as optical transparency, mechanical strength, heat retardancy, flexibility and the like of the material. For example, a radiation curable, electron beam curable, or thermosetting resin, desirably an ultraviolet curable resin or a thermosetting resin is selected, and an ultraviolet curable or thermosetting monomer or oligomer, or a mixture of the monomer and the oligomer is desirably used. More desirably, an ultraviolet curable resin is selected.

As a specific material making the lower clad 20a, for example, an epoxy-based resin, an acrylic-based resin (polymethylmethacrylate or the like), an alicyclic acrylic resin, styrene-based resin (polystyrene, acrylonitrile styrene copolymer or the like), an olefin-based resin (polyethylene, polypropylene, ethylene propylene copolymer or the like), an alicyclic olefin resin, a vinyl chloride-based resin, a vinylidene chloride-based resin, a vinyl alcohol-based resin, a vinyl butyral-based resin, an arylate-based resin, a fluorine-containing resin, a polyester-based resin (polyethylene terephthalate, polyethylene naphthalate or the like), a polycarbonate-based resin, cellulose diacetate or cellulose triacetate, an amide-based resin (fatty series, aromatic polyamide or the like), an imide-based resin, a sulfone-based resin, a polyether sulfone-based resin, a polyether ether ketone-based resin, a polyphenylene sulfide-based resin, a polyoxymethylene-based resin, a blend of the resins, and the like are cited.

The lower clad 20a may, for example, be formed by delivering a liquid resin selected from the materials by drops onto a substrate of glass or the like, and applying spin coating to obtain a uniform thickness, and then curing the resultant, or a preformed resin film may be used for forming the lower clad 20a. Although a thickness of the lower clad 20a is not particularly limited, it is desirably from 10 μm to 100 μm, more preferably from 20 μm to 50 μm in view of optical properties, flexible performance, cutting workability, strength and the like which will be described later.

For the core 18, for example, an ultraviolet curable resin is used, and an ultraviolet curable monomer, oligomer, or a mixture of the monomer and the oligomer is desirably used. As a specific material for core, an epoxy-based, acrylic-based ultraviolet curable resin or the like is desirably used.

For example, after a liquid resin of a curable resin for core (ultraviolet curable resin) is applied onto the lower clad 20a in a uniform thickness, ultraviolet rays are irradiated using an ultraviolet lamp, ultraviolet LED, UV irradiating device or the like to cure the resin, by which the core 18 is formed. A thickness of the core 18 is not particularly limited, but may be set in accordance with its application, it is desirably from 20 μm to 120 μm, more desirably from 30 μm to 90 μm in view of optical performance, flexible performance, cutting workability and strength and the like, which will be described later.

For the upper clad 20b, while a material thereof is not particularly limited, as long as a predetermined refractive index difference from the core 18 may be set, the same material as that of the lower clad 20a is desirably used. For example, the same liquid resin as that of the lower clad 20a is applied onto the core 18 in a uniform thickness, and then the resultant is cured, by which the upper clad 20b is formed. A thickness of the upper clad 20b is desirably from 5 μm to 100 μm, more desirably from 10 μm to 50 μm in view of optical performance, flexible performance, cutting workability, strength and the like, which will be described later. The lower clad 20a and the upper clad 20b do not need to be the same in thickness, and for example, a thickness of the upper clad 20b may be made thinner than that of the lower clad 20a to keep a total thickness of the layered body 10A smaller.

Moreover, the size and the total thickness of the layered body 10A are not particularly limited, but may be set appropriately in accordance with the materials, application and the like. However, for example, in order to make the optical waveguide film 10 flexible, the thickness of the layered body 10A is desirably from 50 μm to 300 μm, more desirably from 50 μm to 200 μm. On the other hand, a width of the layered body 10A is desirably from 0.25 mm to 10 mm, more desirably from 0.25 mm to 5 mm. Setting the thickness and the width of the optical waveguide film 10 to the above-mentioned ranges makes it easier to ensure the flexibility and the strength as an optical waveguide.

Figure 4B:
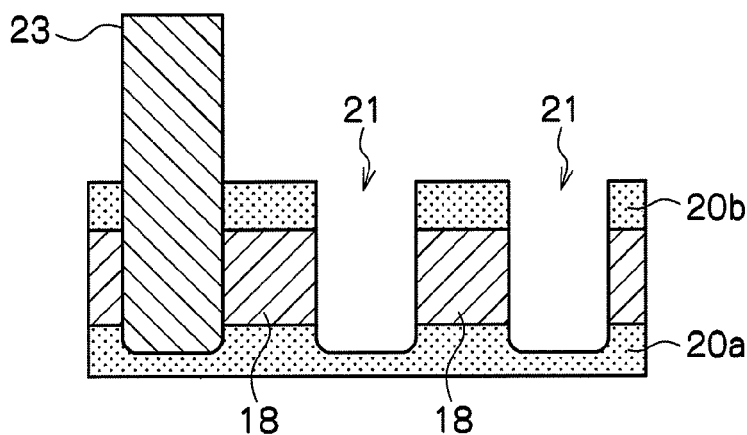
Figure 4C:
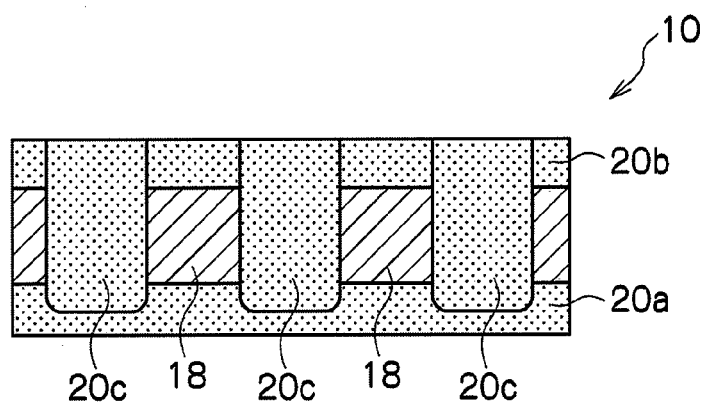

Next, cut grooves 21 formed by partially removing the laminated body 10A by means of cutting using a dicing saw 23 as shown in FIG. 4B are buried with the resin for clad having a lower refractive index than that of the core 18. For example, as shown in FIG. 4C, by causing the curable resin for clad to flow into the cut grooves 21 formed on the layered body 10A, and curing the same, the buried clads 20c are formed. Also, while the buried clads 20c are not particularly limited, as long as a material thereof allows a predetermined refractive index difference from the core 18 to be set, the same material as that of the lower clad 20a is desirably used. For example, by delivering the curable resin for clad by drops on the principal plane side, and spreading the same by centrifugal force in a spin coating process, the inside of each of the cut grooves 21 is filled with the curable resin for clad. The method for applying the curable resin for clad is not limited to the spin coating process, but, for example, a method may also be employed in which the curable resin for clad is pressed by a glass substrate or the like while controlling a film thickness by a spacer to be cured by exposure.

Figure 3A:
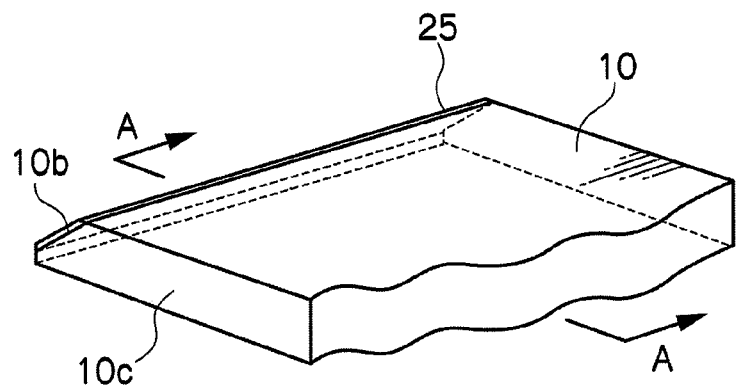
FIG. 3A is a perspective diagram of an end portion of an optical waveguide film of the optical reception and transmission module according to the exemplary embodiment.
Figure 3B:
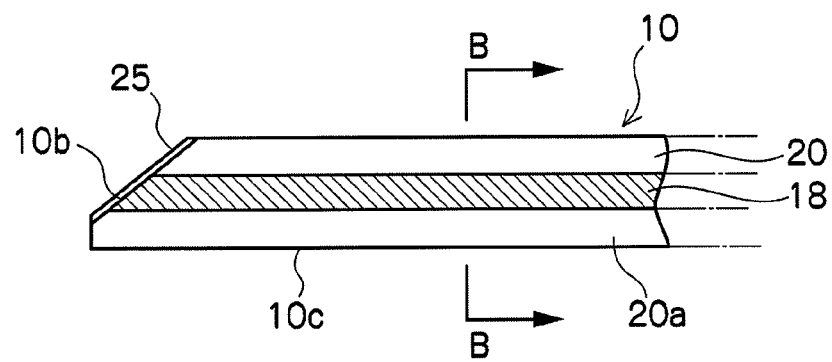
FIG. 3B is a cross-sectional diagram taken along a line A-A in FIG. 3A.
Figure 3C:
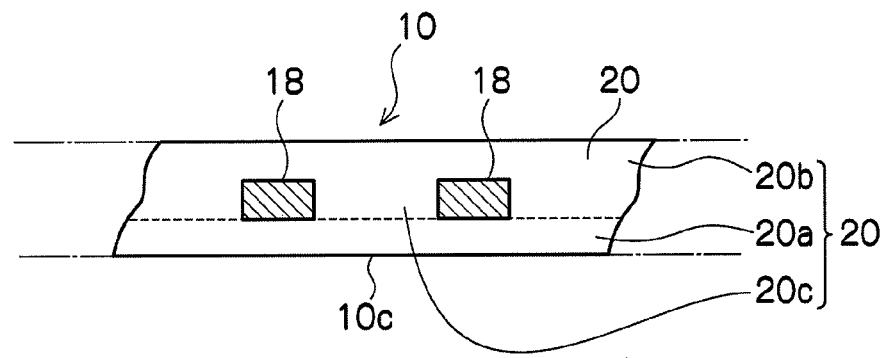
FIG. 3C is a cross-sectional diagram taken along a line B-B in FIG. 3B.

As shown in FIGS. 3A to 3C, mirror surfaces 10b are formed at an angle of 45° with respect to optical axes of the optical waveguides at end portions of the optical waveguide film 10. The mirror surfaces 10b function as optical path converting surfaces for converting optical paths of lights guided by the optical waveguides. In other words, the optical paths of the lights guided by the optical waveguides are bent at 90° in the mirror surfaces 10b and lights are emitted from film surface 10c on a light incident/emitting side.

The mirror surfaces 10b are provided with metal films 25. For this metal film 25, gold, silver, copper, or an alloy of any of them may be used. For the formation of the metal films 25 onto this mirror surfaces 10b, film deposition by a sputtering method, a vacuum deposition method or the like is used.

In the optical reception and transmission module 11 of the exemplary embodiment, the optical waveguide film 10, the light emitting devices 32, the light receiving devices 34, the driving circuits 36, and the amplifying circuits 37 are covered with the flame-retardant resin. Therefore, the flame-retardant resin is interposed between the mirror surfaces 10b and the light receiving devices 34, the light emitting devices 32, or the wiring surfaces and the function of converting the light paths at 90° of the mirror surfaces 10b may be impaired in some cases. However, by filling transparent material to bond the light receiving devices 34 and the light emitting devices 32, and the optical waveguide film 10 to each other and providing the metal films 25 on the mirror surfaces 10b, impairment of the function of converting the light paths at 90° of the mirror surfaces 10b can be suppressed by the metal films 25.

Next, a structure of the optical reception and transmission unit 12 having the holding member 22 will be described. Because the holding member 24 has the same structure as the holding member 22 and the optical reception and transmission unit 14 has the same structure as the optical reception and transmission unit 12, the holding member 24 and the optical reception and transmission unit 14 will be not be described.

The holding member 22 is made of a substantially rectangular parallelepiped substrate. The holding member 22 is provided with the light receiving device 34, the light emitting device 32, the driving circuit 36, and the amplifying circuit 37, as described above. The light receiving device 34 and the amplifying circuit 37 are connected and the light emitting device 32 and the driving circuit 36 are connected electrically by wires 33, respectively. As the light emitting device 32, a surface light emitting device is used. As the light receiving device 34, a surface light receiving device is used. Because the light receiving device 34 is thinner than the light emitting device 32 in many cases, it is preferable that a positioning spacer 41 made of silicon base material or the like is disposed between the holding member 22 and the optical waveguide film 10 and in an area adjacent to the light emitting device 32 of the optical waveguide film 10 for height adjustment.

Although the optical waveguide for transmitting the optical signal from the optical reception and transmission unit 12 is referred as the optical waveguide for transmitting and the optical waveguide for receiving the optical signal from the optical reception and transmission unit 12 is referred to as the optical waveguide for receiving in the exemplary embodiment, it is needless to say that the optical waveguide for transmitting and the optical waveguide for receiving are reversed when viewed from the optical reception and transmission unit 14.

The optical reception and transmission unit 12 is formed by mounting the light emitting device 32, the light receiving device 34, the driving circuit 36, and the amplifying circuit 37 on the holding member 22 using a flip-chip bonder and then electrical wiring is carried out between the elements by using a wire bonder, for example. Then, the optical waveguide film 10 is mounted onto the light emitting device 32 and the light receiving device 34 by using the flip-chip bonder. As a result, the optical waveguide film 10 is held on the holding member 22 and the holding member 24.

Moreover, by applying the flame-retardant resin onto the surfaces of the driving circuits 36, the amplifying circuits 37, the light emitting devices 32, the light receiving devices 34, and the optical waveguide film 10 mounted or held on the respective holding member 22 and holding member 24 by using the dispenser, the flame-retardant resin layer 13 made of the flame-retardant resin is formed on their surfaces.

By the above process, the optical reception and transmission module 11 of the exemplary embodiment in which the surfaces of the driving circuits 36, the amplifying circuits 37, the light emitting devices 32, the light receiving devices 34, the wires electrically connected to these elements, and the optical waveguide film 10 forming the optical reception and transmission module 11 are covered with the flame-retardant resin is manufactured.

Next, with reference to FIG. 5, operation of the optical reception and transmission module 11 according to the exemplary embodiment will be described. FIG. 5 diagrammatically shows a structure of the optical reception and transmission module. In the following description, the optical waveguide for transmitting the optical signal from the optical reception and transmission unit 12 is referred to as the optical waveguide for transmitting and the optical waveguide for receiving the optical signal from the optical reception and transmission unit 12 is referred to as the optical waveguide for receiving.

In the optical reception and transmission module according to the exemplary embodiment, to transmit the optical signal from the optical reception and transmission unit 12 to the optical reception and transmission unit 14, light emitted from the light emitting device 32 held by the holding member 22 of the optical reception and transmission unit 12 is coupled to the incident end surface of the cores 18 of the optical waveguide for transmitting and guided by the optical waveguide for transmitting formed in the optical waveguide film 10. Then, light emitted from the emitting end surface of the core 18 of the optical waveguide for transmitting is received by the light receiving device 34 held by the holding member 24 of the optical reception and transmission unit 14.

Similarly, to receive the optical signal transmitted from the optical reception and transmission unit 14 by the optical reception and transmission unit 12, light emitted from the light emitting device 32 held by the holding member 24 of the optical reception and transmission unit 14 is coupled to the incident end surface (mirror surface 10b) of the core 18 of the optical waveguide for receiving and guided by the optical waveguide for receiving formed in the optical waveguide film 10. Then, light emitted from the emitting end surface (mirror surface 10b) of the core 18 of the optical waveguide for receiving is received by the light receiving device 34 held on the holding member 22 of the optical reception and transmission unit 12.

Although the optical reception and transmission module for carrying out bidirectional optical communication between the optical transmitting and reception units mounted with both the light emitting devices and light receiving devices has been described in the exemplary embodiment, it may be the optical reception and transmission module for carrying out unidirectional optical communication between an optical transmission unit having a light emitting device and an optical reception unit having a light receiving device.

Although the invention will be described specifically below by using examples, the invention is not limited to these examples.

EXAMPLE 1

Manufacturing of the Optical Waveguide Film

First, an epoxy-based film (thickness: 50 μm, refractive index: 1.57) having a high refractive index to serve as a core is prepared. Next, an epoxy-based ultraviolet curable resin having a refractive index of 1.51 is applied to both surfaces of this epoxy-based film having the high refractive index as the core by spin coating in a thickness of 20 μm, and is irradiated with ultraviolet rays to be cured, by which a three-layered film is obtained.

The three-layered film is placed in a dicing saw (trade name: DAD321, manufactured by DISCO Corporation), and using the dicing saw to which a blade having a thickness of 100 μm is attached, the film is cut from a principal surface (top surface) side at a precision of 75 μm±5 μm. Next, by moving 50 μm to cut the same, a projected portion corresponding to the core having a core diameter of 50 μm is formed. Next, by moving 450 μm to cut the same, and further moving 50 μm to cut the same, a duplex core having a core diameter of 50 μm and a pitch of 500 μm is formed.

Next, the epoxy-based ultraviolet curable resin having the refractive index of 1.51 is applied to the cut recessed portion so as to be buried therein, and then is irradiated with ultraviolet rays to be cured and a belt-shaped optical waveguide film having width of 1.0 mm and film thickness of 90 μm is formed.

Then, by using the dicing saw having an Si blade angled at 45°, each of ends of the optical waveguide film is cut at angles of 45 with respect to optical axes to expose the cores having 45-degree mirror surfaces. Next, the clad portion is cut perpendicularly to optical axes in a position at a distance of 50 μm from each tip end to obtain the optical waveguide film having the 45-degree mirror surfaces and the vertical cut surfaces at end portions. Furthermore, for this mirror surface, an Ag alloy film is deposited in a thickness of 100 nm by sputtering of an Ag alloy to manufacture a metal film. Finally, dicing is performed using an ordinary blade to thereby manufacture an optical waveguide film having thickness of 90 μm, length of 100 mm, and width of 1 mm and having the metal films on the 45-degree mirror surfaces at the end portions.

<Mounting to the Module>

After mounting VCSEL elements (trade name: AM-0001, manufactured by Fuji Xerox Co., Ltd.), photodiode elements (trade name: D8485-1026, manufactured by EMCORE Corporation), amplifying circuits (trade name: ONET2591TA, manufactured by Texas Instruments), and driving circuits (trade name: MAX3741, manufactured by Maxim Integrated Products, Inc.) on a silicon substrate having thickness of 600 nm by using a flip-chip bonder, electrodes of respective chips are connected by wires by using a wire bonder. Next, the optical waveguide film having the metal films provided on the mirror surfaces is mounted on the mounted VCSEL elements and the photodiode elements by using the flip-chip bonder. For the adhesion, an epoxy-based curable resin is used and cured by UV irradiation. In this way, the optical reception and transmission module is prepared.

<Application of Flame-Retardant Resin>

As the flame-retardant resin, a one-pack type condensation curable type silicon resin manufactured by Shin-Etsu Chemical Co., Ltd is prepared.

—Characteristics of Flame-Retardant Resin Used in Example 1—

Viscosity when the resin is uncured: 20 Pa·s

Tensile strength: 4.0 MPa

Content of low-molecular siloxane having a cyclic dimethyl type bond content of D3 (trimer) to D20 (20-mer): less than 300 ppm Type of flame-retardant filler: silicon oxide and titanium oxide Total content of the flame-retardant filler: 50% by weight Flame retardancy according to a UL-94 test: V-0

This flame-retardant resin is applied using an application robot (trade name: FAD320S, manufactured by MUSASHI ENGINEERING Inc.) so as to cover the optical waveguide film surface of the optical reception and transmission module, which is adjusted in the Example 1, the VCSEL element, the photodiode element, the driving circuits, the amplifying circuits, and wires as various electrodes, which are mounted on the substrate, and then is left at a room temperature (25° C.) for 10 minutes to be cured.

A measurement showed that a layer thickness of the flame-retardant resin layer formed by curing the applied flame-retardant resin is 0.2 mm.

A minimum bending radius of the optical waveguide film whose surface is covered with the flame-retardant resin is measured according to ASTM D-2176 to find that the minimum bending radius of the optical waveguide film covered with the flame-retardant resin is 1.5 mm. Thus, it may be said that an optical reception and transmission module excellent in bending performance and flame retardancy is provided.

EXAMPLE 2

In cutting the three-layered film adjusted in the Example 1 by the dicing saw, the same materials and the same method as those in Example 1 are used to adjust an optical reception and transmission module except that the film is cut from a principal surface (top surface) side at a precision of 75 μm±5 μm and then, is moved 50 μm to be cut, by which a single core having a core diameter of 50 μm is formed.

In the adjusted optical reception and transmission module, the minimum bending radius of the optical waveguide film whose surface is covered with the flame-retardant resin is measured according to ASTM D-2176. The minimum bending radius of the optical waveguide film whose surface is covered with the flame-retardant resin is 1.5 mm.

Consequently, it may be said that the optical reception and transmission module excellent in bending performance and flame retardancy is provided.

EXAMPLE 3

An optical reception and transmission module is adjusted by using the same materials and method as those in the example 2 except that frame-retardant resin having the following characteristics is used as the flame-retardant resin. In the example 3, two-component addition curable silicon resin manufactured by Shin-Etsu Chemical Co., Ltd. is prepared as the flame-retardant resin.

—Characteristics of Flame-Retardant Resin Used in Example 3—

Viscosity when the resin is uncured: 1 Pa·s

Tensile strength: 1.0 MPa

Content of low-molecular siloxane having a cyclic dimethyl type bond content of D3 (trimer) to D10 (10-mer): less than 500 ppm Type of flame-retardant filler: silicon oxide Total content of the flame-retardant filler: 10% by weight Flame retardancy according to a UL-94 test: V-0

In the adjusted optical reception and transmission module, the minimum bending radius of the optical waveguide film whose surface is covered with the flame-retardant resin is measured according to ASTM D-2176. The minimum bending radius of the optical waveguide film whose surface is covered with the flame-retardant resin is 1.5 mm.

Consequently, it may be said that the optical reception and transmission module excellent in bending performance and flame retardancy is provided.

What is claimed is:

1. An optical reception and transmission module comprising:
    an optical waveguide film formed with an optical waveguide;
    an optical transmission unit having a light emitting device and a first holding member for holding the light emitting device, and which holds a first end portion of the optical waveguide film on the first holding member so that light emitted from the light emitting device is coupled to an incident end surface of the optical waveguide; and
    an optical reception unit comprising a light receiving device and a second holding member for holding the light receiving device, and which holds a second end portion of the optical waveguide film on the second holding member so that light emitted from an emitting end surface of the optical waveguide is received by the light receiving device,
    wherein at least the optical waveguide film is covered with flame-retardant resin having flame retardancy of HB or higher according to a UL-94 test and a minimum bending radius of the optical waveguide film covered with the flame-retardant resin and having a flame-retardant resin layer formed on a surface thereof is from 1 mm to 3 mm.

2. The optical reception and transmission module according to claim 1, wherein the optical transmission unit comprises a driving circuit held by the first holding member for driving at least the light emitting device and the optical reception unit comprises an amplifying circuit held by the second holding member for amplifying at least a signal obtained from the light receiving device.

3. The optical reception and transmission module according to claim 2, wherein the optical waveguide film and at least one of the driving circuit, the light emitting device, the amplifying circuit, or the light receiving device are covered with the flame-retardant resin.

4. The optical reception and transmission module according to claim 1, wherein at least a portion of the optical waveguide film in contact with the flame-retardant resin layer comprises an acrylic-based resin or an epoxy-based resin.

5. The optical reception and transmission module according to claim 2, wherein at least a portion of the optical waveguide film in contact with the flame-retardant resin layer comprises an acrylic-based resin or an epoxy-based resin.

6. The optical reception and transmission module according to claim 3, wherein at least a portion of the optical waveguide film in contact with the flame-retardant resin layer comprises an acrylic-based resin or an epoxy-based resin.

7. The optical reception and transmission module according to claim 1, wherein the flame-retardant resin includes low-molecular siloxane of 500 ppm or less.

8. The optical reception and transmission module according to claim 2, wherein the flame-retardant resin includes low-molecular siloxane of 500 ppm or less.

9. The optical reception and transmission module according to claim 3, wherein the flame-retardant resin includes low-molecular siloxane of 500 ppm or less.

10. The optical reception and transmission module according to claim 4, wherein the flame-retardant resin includes low-molecular siloxane of 500 ppm or less.

11. The optical reception and transmission module according to claim 1, wherein the flame-retardant resin includes flame-retardant filler.

12. The optical reception and transmission module according to claim 2, wherein the flame-retardant resin includes flame-retardant filler.

13. The optical reception and transmission module according to claim 3, wherein the flame-retardant resin includes flame-retardant filler.

14. The optical reception and transmission module according to claim 4, wherein the flame-retardant resin includes flame-retardant filler.

15. The optical reception and transmission module according to claim 7, wherein the flame-retardant resin includes flame-retardant filler.

16. The optical reception and transmission module according to claim 1, wherein the tensile strength of the flame-retardant resin layer is from 0.5 MPa to 5 MPa.

17. The optical reception and transmission module according to claim 1, wherein the viscosity of the flame-retardant resin is from 1 Pa·s to 30 Pa·s.

18. The optical reception and transmission module according to claim 1, wherein the thickness of the flame-retardant resin layer is from 20 μm to 100 μm.

19. The optical reception and transmission module according to claim 1, wherein the flame-retardant resin layer is provided by applying the flame-retardant resin using a dispenser and curing the resin.

20. An optical reception and transmission module comprising:
    an optical waveguide film formed with an optical waveguide;
    an optical transmission unit comprising a light emitting device and a first holding member for holding the light emitting device, and which holds a first end portion of the optical waveguide film on the first holding member so that light emitted from the light emitting device is coupled to an incident end surface of the optical waveguide; and
    an optical reception unit comprising a light receiving device and a second holding member for holding the light receiving device, and which holds a second end portion of the optical waveguide film on the second holding member so that light emitted from an emitting end surface of the optical waveguide is received by the light receiving device,
    wherein at least the optical waveguide film is covered with flame-retardant resin having flame retardancy of HB or higher according to a UL-94 test and a minimum bending radius of the optical waveguide film covered with the flame-retardant resin and having a flame-retardant resin layer formed on a surface thereof is form 1 mm to 3 mm,
    the optical transmission unit comprises a driving circuit held by the first holding member for driving at least the light emitting device and the optical reception unit comprises an amplifying circuit held by the second holding member for amplifying at least a signal obtained from the light receiving device, the optical waveguide film and at least one of the driving circuit, the light emitting device, the amplifying circuit, or the light receiving device are covered with the flame-retardant resin, at least a portion of the optical waveguide film in contact with the flame-retardant resin layer comprises an acrylic-based resin or an epoxy-based resin, the flame-retardant resin includes low-molecular siloxane of 500 ppm or less, the flame-retardant resin includes flame-retardant filler, the tensile strength of the flame-retardant resin layer is from 0.5 MPa to 5 MPa, the viscosity of the flame-retardant resin is from 1 Pa·s to 30 Pa·s, the thickness of the flame-retardant resin layer is from 20 μm to 100 μm, and the flame-retardant resin layer is provided by applying the flame-retardant resin using a dispenser and curing the resin.

* * * * *